(12) United States Patent
Gruber et al.

(10) Patent No.: US 8,054,657 B2
(45) Date of Patent: Nov. 8, 2011

(54) STATIC CONVERTER

(75) Inventors: Rainer Gruber, Heilsbronn (DE);
Ulrich Halfmann, Bräuningshof (DE);
Marc Hiller, Nürnberg (DE); Wolfgang Recker, Möhrendorf (DE)

(73) Assignee: Siemens Aktiengesellschaft, Munich (DE)

( * ) Notice: Subject to any disclaimer, the term of this patent is extended or adjusted under 35 U.S.C. 154(b) by 429 days.

(21) Appl. No.: 12/320,759

(22) Filed: Feb. 4, 2009

(65) Prior Publication Data
US 2009/0196078 A1    Aug. 6, 2009

(30) Foreign Application Priority Data

Feb. 6, 2008   (DE) .................... 10 2008 007 658

(51) Int. Cl.
*H02M 5/45*   (2006.01)
(52) U.S. Cl. ................ 363/36; 363/2; 363/129
(58) Field of Classification Search ............ 363/2, 34, 363/35, 36, 85, 87, 125–129
See application file for complete search history.

(56) References Cited

U.S. PATENT DOCUMENTS

| | | | | |
|---|---|---|---|---|
| 4,204,265 A | * | 5/1980 | McLeod | 363/71 |
| 4,567,554 A | * | 1/1986 | Zetterberg et al. | 363/138 |
| 4,800,481 A | * | 1/1989 | Knaffl et al. | 363/70 |
| 2008/0205093 A1 | * | 8/2008 | Davies et al. | 363/35 |
| 2008/0310205 A1 | * | 12/2008 | Hiller | 363/131 |
| 2011/0002149 A1 | * | 1/2011 | Hiller et al. | 363/126 |

FOREIGN PATENT DOCUMENTS

| | | |
|---|---|---|
| DE | 101 03 031 A1 | 7/2002 |
| DE | 10 2005 040 543 A1 | 3/2007 |
| DE | 10 2005 045 090 | 4/2007 |
| EP | 0 078 117 A2 | 5/1983 |
| WO | WO 2007/023061 | 3/2007 |
| WO | WO 2007/028349 A1 | 3/2007 |
| WO | WO 2007/028350 A1 | 3/2007 |

OTHER PUBLICATIONS

R. Marquardt, A. Lesnicar, J. Hildinger ETG-Tagungsband 2002; "Modulares Stromrichterkonzept für Netzkupplingsanwendung bei hohen Spannungen" with Abstract and partial English translation.

(Continued)

*Primary Examiner* — Jessica Han
(74) *Attorney, Agent, or Firm* — Harness, Dickey & Pierce, P.L.C.

(57) ABSTRACT

A static converter includes a current converter on the three-phase side and a current converter on the single-phase side, which are electrically conductively linked to one another on the DC voltage side, and which are respectively electrically conductively connected on the AC voltage side to a feeding three-phase network and a single-phase receiving network. According to an embodiment of the invention, one network-commutated current converter is provided as the current converter on the three-phase side, wherein the current converter on the single-phase side has two phase modules which are connected in parallel on the DC voltage side and whose current converter branches each have at least one two-pole subsystem. This results in a static converter which is simpler and costs less than a known static converter.

18 Claims, 3 Drawing Sheets

OTHER PUBLICATIONS

Eb—Elektrische Bahnen Band 89 (1991), Nr. 11, Seiten 395 bis 397; "Konzepte Umformer zur Bereitstellung von 16 2/3 Hz-Energie mittels Leistungselektronik" with Abstract and partial English translation.

Eb—Elektrische Bahnen Band 89 (1991), Nr. 11, Seiten 398 bis 400; "Statischer Umformer zur Kupplung von Bahnnetzen und Landesnetzen" with Abstract and partial English translation.

Heumann und Stumpe, Thyristoren, Eigenschaften und Anwendungen, B.G. Teubner-Verlag, Stuttgart, S. 111, 113 with Abstract and partial English translation.

Lesnicar, and Marquardt "An Innovative Modular Multilevel Converter Topology Suitable for a Wide Power Range".

* cited by examiner

STATIC CONVERTER

PRIORITY STATEMENT

The present application hereby claims priority under 35 U.S.C. §119 on German patent application number DE 10 2008 007 658.9 filed Feb. 6, 2008, the entire contents of which is hereby incorporated herein by reference.

FIELD

At least one embodiment of the invention generally relates to a static converter.

Static converters such as these are used for coupling railroad electrical power supply networks to national grid systems. Since the railroad electrical power supply networks use a frequency of 16⅔ Hz or 25 Hz and the national grid systems use a frequency of 50 Hz or 60 Hz and the railroad electrical power supply systems are designed with a single phase and the national grid systems are designed with three phases, these two networks cannot be coupled directly. Static converters are used to couple these two different networks and are also referred to as static railroad converters or static frequency converters.

Two concepts for a static converter are known from the publication entitled "Konzepte zur Bereitstellung von 16⅔ Hz—Energie mittels Leistungselektronik" [Concepts for provision of 16⅔ Hz power by means of power electronics], printed in the German Journal "eb—Elektrische Bahnen" [Electrical Railroad], Volume 89, 1991, Issue 11, pages 395 to 397, the entire contents of which are hereby incorporated herein by reference. One concept has a common intermediate circuit while, in contrast, the second concept is modular and is provided with separate intermediate circuits.

The converter concept with a common intermediate circuit has two thyristor reversing current converters on the three-phase side (national grid system) which are connected to a feeding network by way of a transformer on the three-phase side and are electrically connected in parallel on the DC voltage side. The current converter (railroad network) on the single-phase side also comprises 12 GTO four-quadrant controllers which are each provided with one transformer winding on the AC voltage side. On the DC voltage side, these GTO four-quadrant controllers are electrically connected in parallel with the voltage intermediate circuit, which has an intermediate circuit capacitor and a series resonant circuit. On the primary side, the transformer windings are electrically connected in series, thus resulting in voltage addition.

The modular concept of a static converter comprises parallel connection of a plurality of units which each have 3 GTO four-quadrant controllers, with associated transformer windings, in each case on the three-phase side and on the single-phase side. At the same time, these 6 GTO four-quadrant controllers of a unit are coupled to one another by means of a voltage intermediate circuit. This modular concept results in all the GTO phase modules of the GTO four-quadrant controllers on the three-phase side and on the single-phase side being approximately equally loaded.

A further concept for a static converter is known from the publication entitled "Statischer Umformer zur Kupplung von Bahnnetzen und Landesnetzen" [Static converter for coupling of railroad networks and national grid systems], printed in the German Journal "eb—Elektrische Bahnen" [Electrical railroad], Volume 89, 1991, Issue 11, pages 398 to 400, the entire contents of which are hereby incorporated herein by reference. In this concept, two pulse-controlled inverters are arranged on the three-phase side of the static converter, and four four-quadrant controllers with associated transformer windings are arranged on the single-phase side. The pulse-controlled inverters and the voltage intermediate circuit are each in the form of three-point circuits. On the three-phase side, these pulse-controlled inverters are connected by way of a transformer to a feeding three-phase network, with the secondary windings of this transformer device being designed such that a shift angle occurs. On the single-phase side, four controller voltages are available and are shifted through an angle with respect to one another so as to minimize voltage harmonics.

These concepts of a static converter have the common feature of a voltage intermediate circuit which on the one hand has at least one intermediate-circuit capacitor and on the other hand has a series resonant circuit. Furthermore, the voltage intermediate circuit may have a braking controller in order to limit the overvoltages that occur. In addition, on the single-phase side, these concepts have a multiplicity of GTO four-quadrant controllers with associated transformer windings, and this leads to a complex transformer design. The large number of thyristors which can be turned off, which are also referred to as Gate-Turn-Off thyristors (GTO thyristors) or Insulated Gate Bipolar Transistors (IGBTs) are provided with complex circuits.

A converter concept for network couplings is known from the publication entitled "Modulares Stromrichterkonzept für Netzkupplungsanwendung bei hohen Spannungen" [Modular current converter concept for network coupling use and high voltages], printed in the Proceedings of the ETG Conference 2002, the entire contents of which are hereby incorporated herein by reference. This current converter concept has two three-phase converters which are electrically conductively connected to one another on the DC voltage side. Each current converter has a respective phase module, corresponding to the number of network phases. Each phase module has an upper and a lower current converter branch, which has at least one two-pole subsystem. The proposed concept has four two-pole subsystems for each current converter valve. Each subsystem comprises a module capacitor and two semiconductor switches which are electrically connected in series and can be turned off, with this series circuit being electrically connected in parallel with the module capacitor.

SUMMARY

In at least one embodiment of the invention specifies a static converter which is of simple design and costs less.

Since a network-commutated current converter as the current converter on the three-phase side and the current converter on the one-phase side, comprising at least one two-pole subsystem for each current converter branch, are provided, this results in a static converter which has a simple and low-cost feed circuit, and which, on the single-phase side, uses semiconductor switches which can be turned off. Furthermore, this static converter according to the invention has no intermediate-circuit capacitor and no series resonant circuits either. In consequence, the converter installation need no longer be designed for a low-impedance intermediate-circuit short-circuit current. Furthermore, the $i^2t$ requirement for the current converter valves in the current converter on the network side can be reduced considerably in comparison to a voltage intermediate-circuit converter with a diode feed.

A further advantage of the static converter according to an embodiment of the invention is that this static converter can be electrically conductively connected on the single-phase side by way of an inductor to an overhead line of a railroad network. This advantage results from the use of numerous two-pole subsystems in the current converter branches of the current converter on the single-phase side. This results in generation of a single-phase AC voltage which is approximately sinusoidal and whose amplitude corresponds to the voltage amplitude of the railroad network.

In one advantageous embodiment of the static converter according to the invention, the current converter on the three-phase side has at least two network-commutated three-phase current converters which are electrically connected in series on the DC voltage side, with this converter being connected to a feeding three-phase network by way of a transformer with two secondary windings, between which there is a predetermined shift angle. This considerably reduces the harmonic load on the feeding network. Furthermore, a conventional current-converter transformer can be used as the transformer. A feed circuit designed in this way has twelve pulses. If the feed circuit is intended to have higher numbers of pulses, for example twenty four, then four network-commutated three-phase current converters must be provided for this purpose, and must be electrically connected in series on the DC voltage side. The number of secondary windings on the transformer increases corresponding to the increase in the number of network-commutated three-phase current converters. However, the current harmonics on the three-phase network side are decreased, and it is possible to avoid the possible need for a filter on the three-phase side.

In a further advantageous embodiment of the static converter according to an embodiment of the invention, at least one B6 diode bridge is provided as the network-commutated current converter. Since this is an uncontrolled embodiment, there is no longer any need for open-loop and/or closed-loop control. In particular, there is no need for rapid pilot control of the feed circuit as in the case of known static converters. Furthermore, the feed circuit of the static converter according to the invention requires less installation space and has lower losses.

In addition, this further advantageous embodiment has a precharging resistor which can be bridged and is arranged at least in one of the two DC voltage busbars. This precharging resistor is used to charge the module capacitors of each two-pole subsystem of the current converter on the single-phase side.

In a further advantageous embodiment of the static converter according to an embodiment of the invention, at least one B6 thyristor bridge is provided as the network-commutated three-phase current converter. In comparison to the embodiment with a B6 diode bridge, there is now no longer any need for a precharging resistor which can be bridged, since the precharging of the module capacitors of each two-pole subsystem is carried out by way of the thyristors in the current converter on the three-phase side. A control device is required for this purpose, but its complexity is low. Furthermore, voltage fluctuations in the feeding three-phase network can be regulated out by this embodiment of the current converter on the three-phase side of the static converter.

In a further advantageous embodiment of the static converter according to the invention, a thyristor reversing current converter is provided as the network-commutated three-phase converter. In comparison to the embodiment with a thyristor bridge, power can now be fed back from the single-phase network to the feeding three-phase network. This embodiment of feed circuit for the static converter according to the invention is considerably less complex than a feed circuit for a known static converter.

BRIEF DESCRIPTION OF THE DRAWINGS

The invention will be explained further with reference to the drawings, which schematically illustrates a plurality of embodiments of a static converter according to the invention, and in which.

DETAILED DESCRIPTION OF THE EXAMPLE EMBODIMENTS

Figure 1:
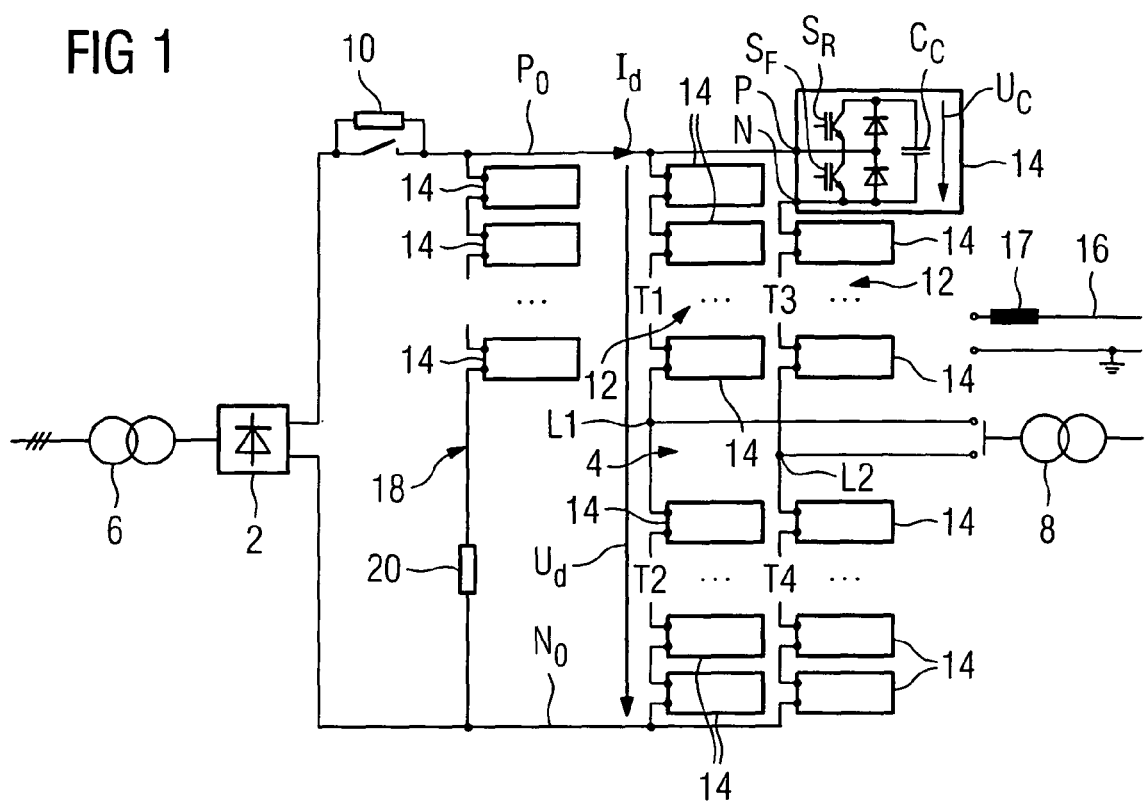
FIG. 1 shows a first embodiment of the static converter according to the invention.

Various example embodiments will now be described more fully with reference to the accompanying drawings in which only some example embodiments are shown. Specific structural and functional details disclosed herein are merely representative for purposes of describing example embodiments. The present invention, however, may be embodied in many alternate forms and should not be construed as limited to only the example embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes,"

and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

FIG. 1 schematically illustrates a circuit diagram of a first embodiment of a static converter according to the invention. 2 denotes a current converter on the three-phase side, 4 a current converter on the single-phase side, 6 a transformer on the three-phase side and 8 a transformer on the single-phase side. A network-commutated current converter in the form of a B6 diode circuit is provided as the current converter 2 on the three-phase side. On the three-phase voltage side, this B6 diode bridge is electrically conductively connected by means of the transformer 6 to a feeding three-phase network which is not illustrated in any more detail. By way of example, a national grid system is provided as the feeding three-phase network. On the DC voltage side, the network-side current converter is electrically linked to a positive and negative DC voltage busbar $P_0$ and $N_0$. In addition, a precharging resistor 10 which can be bridged is provided in the positive DC voltage busbar $P_0$.

The current converter 4 on the single-phase side comprises two phase modules 12 which are electrically connected in parallel on the DC voltage side and are electrically linked to the positive and negative DC voltage busbar $P_0$ and $N_0$. Each phase module 12 has an upper and a lower current converter branch T1, T3, and T2, T4, respectively. A junction point between two current converter branches T1, T2 and T3, T4, respectively, which are electrically connected in series in each phase module 12 in each case form a connection L1 and L2 on the AC voltage side for the transformer 8 on the single-phase side. This transformer 8 on the single-phase side is connected to a single-phase network. By way of example, this single-phase network is a railroad network. This railroad network is represented by an overhead line 16. Alternatively, the current converter 4 on the single-phase side can also be connected directly to the railroad network (overhead line 16) on the AC voltage side by means of an inductor 17.

Each current converter branch T1, . . . , T4 of this current converter 4 on the single-phase side has at least one two-pole subsystem 14. In the illustrated embodiment, three of n two-pole subsystems 14 of a current converter branch T1, . . . , T4 are in each case illustrated. A two-pole subsystem 14 such as this has a module capacitor $C_C$ and two semiconductor switches $S_F$ and $S_R$ which can be turned off. These two semiconductor switches $S_F$ and $S_R$ which can be turned off are electrically connected in series, with this series circuit being electrically connected in parallel with the module capacitor $C_C$. A junction point between the semiconductor switches $S_F$, $S_R$ which can be turned off and are electrically connected in series is formed by a connecting terminal P while, in contrast, a junction point between the module capacitor $C_C$ and the semiconductor switch $S_F$ which can be turned off is formed by a connecting terminal N. This embodiment of the two-pole subsystem 14 and its method of operation are described in more detail in the initially cited publication "ETG Conference 2002". Further embodiments of the two-pole subsystem 14 can be found in DE 10 2005 045 090 A1, the entire contents of which are hereby incorporated herein by reference.

As in the case of the known static converters, a braking controller 18 can be provided in the intermediate circuit, in order to limit overvoltages. This braking controller 18 has a braking resistor 20 and at least one two-pole subsystem 14, which are electrically connected in series between the positive and the negative DC voltage busbar. A modular braking controller 18 such as this is described in more detail in WO 2007/023061 A2, the entire contents of which are hereby incorporated herein by reference.

One conspicuous feature of these static converters according to at least one embodiment of the invention is that they no longer have any intermediate-circuit capacitor and series resonant circuits such that, in the case of this static converter, there is no longer any need to pay attention to a low inductance design outside the submodules 14. Furthermore, in consequence, no low-impedance, intermediate-circuit short circuit any longer occurs.

Figure 2:
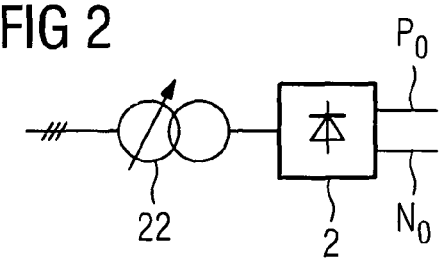
FIGS. 2 and 3 show variants of the feed circuit of the embodiment of the static converter as shown in FIG. 1.

FIG. 2 shows a variant of the feed circuit (on the national grid system side) of the static converter shown in FIG. 1. This variant differs from the feed circuit shown in FIG. 1 in that a transformer 22 with a stepping switch is provided instead of the transformer 6. This stepping switch 22 makes it possible to compensate for the voltage fluctuations in the feeding three-phase network, in order to allow the DC voltage $U_d$ that is produced to be adjusted independently of the network voltage fluctuations and load fluctuations.

Figure 3:
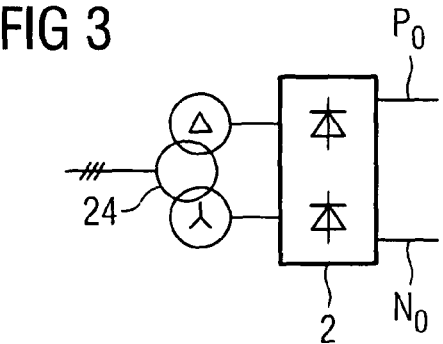

FIG. 3 shows a further variant of the feed circuit (on the national grid system side) of the static converter shown in FIG. 1. This variant differs from the feed circuit shown in FIG. 1 in that the current converter 2 on the three-phase side has two network-commutated, three-phase current converters in a B6 diode circuit. These two network-commutated, three-phase current converters are electrically connected in series on the DC voltage side. On the three-phase voltage side, each network-commutated current converter is electrically conductively linked to a secondary winding of a transformer 24. One secondary winding of the transformer 24 is connected in delta, while in contrast the other secondary winding is connected in star. The shift angle between the transformer voltages on the secondary side is therefore 30° el. This variant of the feed circuit therefore has twelve pulses. This reduces the harmonic load on the feeding three-phase network in comparison to the feed circuit shown in FIG. 1. If the harmonic load on the feeding three-phase network is intended to be reduced further, then the number of network-commutated three-phase current converters must be increased.

Figure 4:
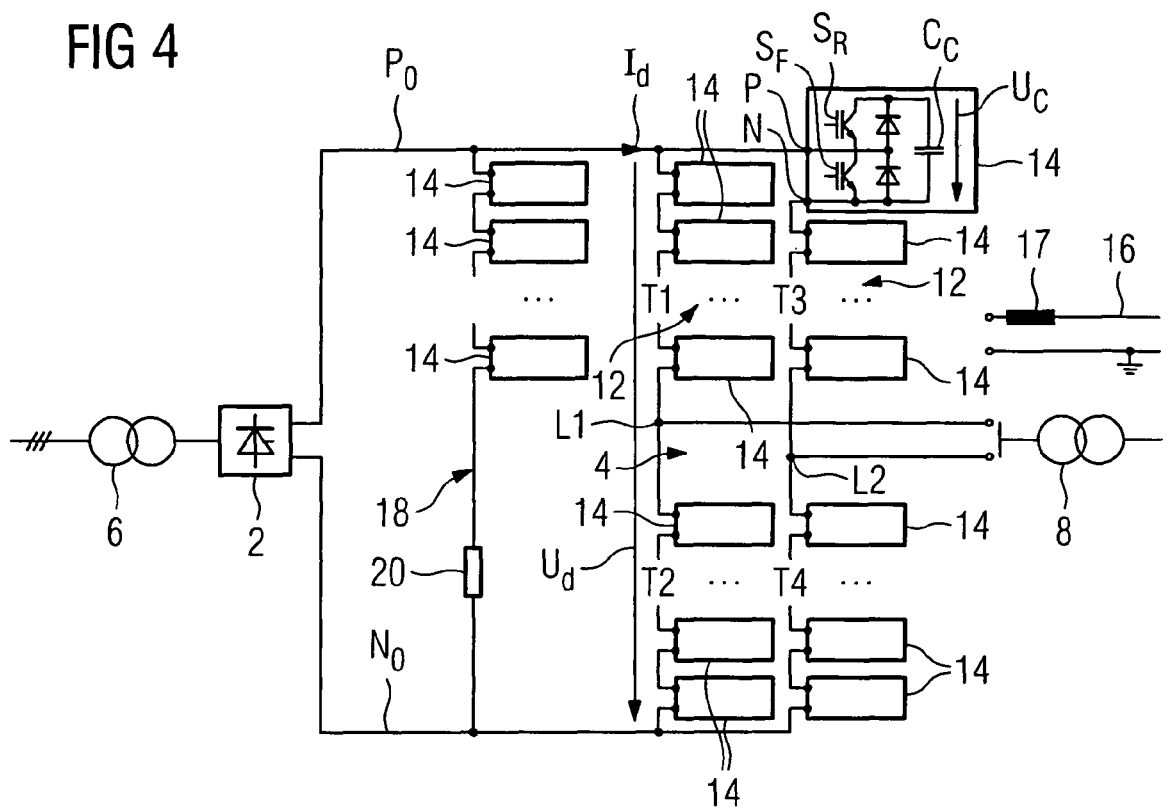
FIG. 4 shows one advantageous embodiment of the static converter according to the invention while, in contrast.

FIG. 4 shows a circuit diagram of a further embodiment of the static converter according to the invention. This embodiment differs from the embodiment shown in FIG. 1 in that a network-commutated three-phase current converter is provided as the current converter 2 on the three-phase side in the B6 thyristor circuit. The use of at least one three-phase thyristor rectifier and a half-controlled bridge circuit instead of at least one three-phase diode rectifier makes it possible to dispense with a precharging resistor 10 which can be bridged.

In this embodiment, the module capacitors $C_C$ in each two-pole subsystem 14 are charged by means of the network-commutated three-phase current converter in the B6 thyristor circuit, for example while the DC voltage $U_d$ is being raised. In comparison to the embodiment shown in FIG. 1, however, closed-loop control is now required. A further advantage of this embodiment over the embodiment shown in FIG. 1 is that voltage fluctuations resulting from network voltage fluctuations and load voltage fluctuations can be compensated for. This means that it is possible to stabilize the DC voltage $U_d$. The half-controlled bridge circuit can also be formed from a diode bridge circuit and a thyristor bridge circuit, which are electrically connected in series on the DC voltage side.

Figure 5:
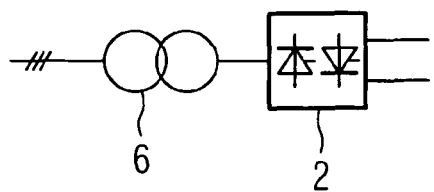
FIG. 5 shows a variant of the embodiment shown in FIG. 4, and FIGS. 6 and 7 each show a further embodiment of the static converter according to the invention.

FIG. 5 shows a further variant of the feed circuit of the static frequency converter in FIG. 4. In this variant, at least one three-phase thyristor reversing current converter is provided as the current converter 2 on the three-phase side of the static converter. A thyristor reversing current converter comprises two thyristor bridges which are connected back-to-back in parallel. It is now possible to additionally feed power back from the railroad network into a national grid system. The complexity in comparison to the current converter on the three-phase side of the static converter according to the publication entitled "Statischer Umformer zur Kupplung von Bahnnetzen und Landesnetzen" [Static converter for coupling railroad networks and national grid systems], the entire contents of which are hereby incorporated herein by reference, is considerably less not only in terms of hardware but also in terms of control.

Figure 6:
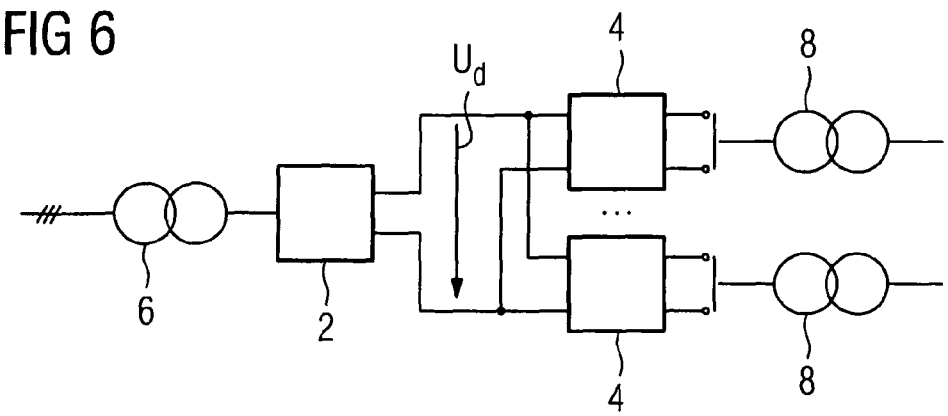

FIG. 6 schematically illustrates a circuit diagram of a further embodiment of the static converter according to the invention. In comparison to the embodiment shown in FIG. 1, this embodiment has at least one further current converter 4 on the single-phase side, which is likewise in the form of a modular multipoint current converter, also referred to as a modular multilevel converter (MMLC or M2C). On the DC voltage side, these current converters 4 on the single-phase side are electrically connected in parallel. On the AC voltage side, these current converters 4 are electrically conductively connected to a railroad network by way of at least one transformer 8. These current converters 4 on the single-phase side, which are fed from the current converter 2 on the three-phase side, make it possible to make full use of the installed current converter rating of the current converter 2 on the three-phase side. This means that the installed power on the feed side (three-phase side) is split between the current converters 4 on the single-phase side (railroad side). This reduces the complexity of the static converter. If a further current converter 4 is added to the current converter 4 on the single-phase side, then this increases the power which is fed in a railroad network, provided that the current converter 2 on the three-phase side can draw this power from a national grid system.

Figure 7:
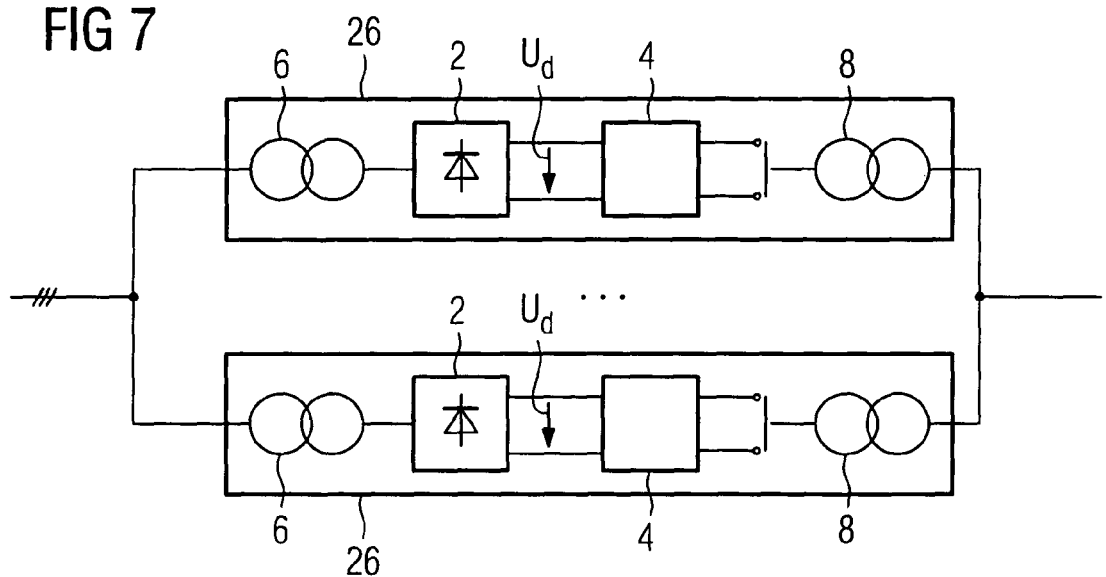

FIG. 7 schematically illustrates a circuit diagram of a further embodiment of a static converter. In this embodiment, the static converter as shown in FIG. 1 forms a converter block 26 with a unit power. In order to create a static converter for a power that is greater than this unit power, at least two converter blocks 26 are electrically connected in parallel. Only two of n converter blocks 26 are illustrated in the embodiment shown in FIG. 7.

If one of the two converter blocks 26 is now in the form of a network coupling according to the publication "ETG Conference 2002", then this converter block can provide the reactive power of the other converter block 26. In addition, the harmonic currents caused by the feed circuit in the first converter block 26 can be compensated for by the second converter block, whose current converter 2 on the three-phase side is designed to be self-commutating. Furthermore, power can be fed into the national grid system from a railroad network via the converter block with a self-commutated current converter, which therefore has a feedback capability, on the three-phase side. The use of a converter block with a self-commutated current converter on the three-phase side makes it possible to exchange reactive power between this converter block and a national grid system thus supporting the network voltage of this national grid system in such a way that the converter block 26 is supplied with a constant network voltage by means of a current converter 2 on the three-phase side which is in the form of a network-commutated three-phase current converter.

The principle of this static converter according to at least one embodiment of the invention is the combination of one or more network-commutated converters with a modular multipoint converter with two-pole subsystems. This results in a static converter which is considerably less complex than known static converters, has no energy store (intermediate-circuit capacitor, series resonant circuit capacitor, series resonant circuit inductor) in the intermediate circuit, costs considerably less, occupies less space and has a lower noise level, and which need not be designed to have a low inductance and has reduced power losses.

The patent claims filed with the application are formulation proposals without prejudice for obtaining more extensive patent protection. The applicant reserves the right to claim even further combinations of features previously disclosed only in the description and/or drawings.

The example embodiment or each example embodiment should not be understood as a restriction of the invention. Rather, numerous variations and modifications are possible in the context of the present disclosure, in particular those variants and combinations which can be inferred by the person skilled in the art with regard to achieving the object for example by combination or modification of individual features or elements or method steps that are described in connection with the general or specific part of the description and are contained in the claims and/or the drawings, and, by way of combinable features, lead to a new subject matter or to new method steps or sequences of method steps, including insofar as they concern production, testing and operating methods.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

Further, elements and/or features of different example embodiments may be combined with each other and/or substituted for each other within the scope of this disclosure and appended claims.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A static converter, comprising:
   a current converter on a three-phase side of the static converter; and
   a current converter on a single-phase side of the static converter, the current converters being electrically conductively linked to one another on a DC voltage side and being respectively electrically conductively connected on a AC voltage side to a feeding network and a receiving network, the current converter on the three-phase side including at least one network-commutated three-phase current converter and the current converter on the single-phase side including two phase modules connected in parallel on the DC voltage side and whose upper and lower current converter branches each have at least one two-pole subsystem.

2. The static converter as claimed in claim 1, wherein the current converter on the three-phase side includes at least two network-commutated three-phase current converters, electrically connected in series on the DC voltage side and connected to a feeding network via a current-converter transformer including a standard transformer having two secondary windings and a predetermined shift angle.

3. The static converter as claimed in claim 2, wherein a B6 diode bridge is provided as the network-commutated three-phase current converter, and wherein a bridgeable precharging resistor is arranged in a positive or negative DC voltage busbar.

4. The static converter as claimed in claim 2, wherein a half-controlled bridge circuit is provided as the network-commutated three-phase current converter.

5. The static converter as claimed in claim 2, wherein a B6 thyristor bridge is provided as the network-commutated three-phase current converter.

6. The static converter as claimed in claim 2, wherein a thyristor reversing current converter is provided as the network-commutated three-phase current converter.

7. The static converter as claimed in claim 2, wherein the current converter on the three-phase side is linked to a feeding network by way of a transformer with a stepping switch.

8. The static converter as claimed in claim 1, wherein a B6 diode bridge is provided as the network-commutated three-phase current converter, and wherein a bridgeable precharging resistor is arranged in a positive or negative DC voltage busbar.

9. The static converter as claimed in claim 1, wherein a half-controlled bridge circuit is provided as the network-commutated three-phase current converter.

10. The static converter as claimed in claim 9, wherein a B6 diode bridge and a B6 thyristor bridge are provided as the half-controlled bridge circuit, and are electrically connected in series on the DC voltage side.

11. The static converter as claimed in claim 1, wherein a B6 thyristor bridge is provided as the network-commutated three-phase current converter.

12. The static converter as claimed in claim 1, wherein a thyristor reversing current converter is provided as the network-commutated three-phase current converter.

13. The static converter as claimed in claim 1, wherein the current converter on the three-phase side is linked to a feeding network by way of a transformer with a stepping switch.

14. The static converter as claimed in claim 1, wherein the current converter on the single-phase side is linked to a railroad network on the AC voltage side, via a transformer.

15. The static converter as claimed in claim 1, wherein the current converter on the single-phase side is linked to a railroad network on the AC voltage side via an inductor.

16. The static converter as claimed in claim 1, further comprising:
    a further current converter, provided on the single-phase side, including two phase modules connected in parallel on the DC voltage side, whose upper and lower current converter branches each have at least one two-pole subsystem, wherein the further current converter on the single-phase side is electrically connected in parallel on the DC voltage side with the first current converter on the single-phase side.

17. The static converter as claimed in claim 1, further comprising:
    a further converter block, including a current converter on the three-phase side and a current converter on the single-phase side, with three- and two-phase modules connected in parallel on the DC voltage side, upper and lower current converter branches of the three- and two-phase modules each including at least one two-pole subsystem, wherein a transformer is provided on the three-phase side and a transformer is provided on the single-phase side, the transformers being electrically conductively connected on the primary side to the feeding and the receiving network.

18. The static converter as claimed in claim 17, wherein the further converter block includes a self-commutated current converter on the three-phase side.

* * * * *